Patented Sept. 22, 1936

2,055,221

UNITED STATES PATENT OFFICE 2,055,221

PROCESS OF PRODUCING TITANIUM PIGMENT

Andreas Johan Ravnestad, Fredriksstad, Norway, assignor to Titan Company Incorporated, Wilmington, Del., a corporation of Delaware No Drawing. Application November 11, 1931, Serial No. 574,466. In Norway November 13, 1930

17 Claims. (Cl. 134—58)

This invention relates to an improved process for preparing titanium dioxide pigments and the improved pigments so produced. The compounds either consist substantially of titanium and oxygen or of these elements combined or mixed with other elements.

One object of this invention is a process for producing these improved pigments.

Another object of this invention is to provide an improved process for the hydrolytic treatment of titanium salt solutions precedent to the production of hydrated titanium compounds.

This invention comprehends, in addition to other improved features, conducting hydrolytic precipitation in a titanium salt solution having a titanium dioxide-sulphuric acid content range within definite limits in connection with the addition thereto, substantially for the purpose of aiding the hydrolytic reaction and improving the properties of the precipitate and of the products obtained therefrom, of an acid-binding substance i. e., an agent or agents capable of forming non-hydrolyzed salts with the hydrolyzable salts present in the solution.

In the usual processes for the production of titanium dioxide and pigments composed thereof, an aqueous mineral acid solution containing titanium compounds is first prepared by decomposing a titanium bearing ore, such as ilmenite, with sulphuric acid. The resulting solution contains, in addition to salts of titanium, compounds of other metals, e. g., iron, aluminum, magnesium and calcium, originally present in the raw titaniferous material, and also slimes, residual siliceous matter and undissolved ore. The solution is freed from these slimes and suspended residual matter by well-known methods and the resulting solution subjected to a reducing treatment, whereby substantially all of the ferric iron content is transformed to the more easily removable ferrous sulphate. Reduction may be carried on until small amounts of the tetravalent titanium content is transformed to its trivalent state. The solution is then clarified if necessary, after which it is concentrated and subjected to hydrolytic precipitation. The resulting hydrated titanium compounds are then washed and calcined.

It has been found that the physical properties of the product produced by processes of the character referred to above depend to a large extent upon the conditions under which the individual steps of the process are conducted and also upon the sequence of the various steps. These are recognized and applied to maximum advantage in the improved process herein set forth.

The invention comprehends the use of a titanium salt solution, resulting from the decomposition of ilmenite by sulphuric acid, which after clarification and reduction contains less sulphuric acid than is necessary to form normal sulphates of all the metallic ions present. And still further, that when a solution of this character is subjected to hydrolytic precipitation, a product having improved physical properties will be produced if, prior to or during the hydrolytic reaction, a small amount of an acid-binding substance acting as a reaction initiator and being capable of forming non-hydrolyzed salts with the hydrolyzable salts present in the solution is added. Substances which are suitable for use as acid binders are, for example, ammonia, the oxides, hydroxides, or carbonates of zinc, magnesium or the alkali metals. Such substances may also be referred to as "initiators".

According to the present invention, a process for the manufacture of titanium dioxide or pigments composed thereof wherein hydrated titanium compounds are hydrolytically precipitated from a titanium concentrated acid-poor titanium sulphate solution, for example, a titanium sulphate solution containing between 150 and 250 grams of titanium dioxide per litre and an amount of acid sufficient for the formation of normal sulphates of the metallic ions in solution other than titanium, and in addition a further quantity of acid less than the amount required for the formation of normal tetravalent sulphates of the titanium present, is characterized by the addition of an acid-binding substance or initiator to the titanium salt solution prior to or during the hydrolytic decomposition. Specifically the process includes both the hydrolytic precipitation of titanium hydrate from a titanium salt solution in which the ratio of titanium dioxide-sulphuric acid content lies within certain limits, hereinafter described, which have been found most advantageous in the production of titanium dioxide pigments having superior pigmental properties, and the addition of an acid-binding substance to the solution prior to or during hydrolysis.

One example of the process of my invention may be given as follows:

An aqueous titanium salt solution is prepared by decomposing ilmenite with sulphuric acid. The total quantity of acid employed in this step is such that there is present in the solution an amount of acid equivalent to the bases in solution other than titanium, for the formation of normal salts of these bases, and, in addition, a further quantity of acid, which is substantially 35% less than the amount required to form normal tetravalent titanium sulphate with all the titanium present in the solution.

As will be understood, the amount of acid remaining after normal salts of metals other than titanium have been formed, is insufficient for the formation of normal tetravalent titanium sulphate with all the titanium present. This shortage of acid content is expressed in per cent and herein termed the "basicity" of the solution.

While any convenient ratio of titanium dioxide to sulphuric acid may be used in the decomposition step, and the solution adjusted if necessary to the desired basicity at any later step prior to precipitation, I find that good results may be obtained by employing, in the decomposition step, a quantity of acid, relative to the amount of titanium present, such as will result in an acid-titanium dioxide content range substantially the same as that employed during hydrolysis. If, however, decomposition is conducted with other acid-titanium dioxide content ratios, or, if processes of precipitation or clarification are such as to bring the acid-titanium dioxide content ratio outside of that to be employed for the purpose of hydrolytic decomposition, the solution to be hydrolytically decomposed, may be concentrated or otherwise treated, so as to bring it within a basicity range of 5% to 50%, prior to hydrolytic decomposition.

The solution thus produced is treated in the usual way with a reducing agent, for example, metallic iron or nascent hydrogen, after which it is freed from slimes. The sulphates other than titanium sulphate, more particularly the ferrous sulphate, resulting from the reduction, may be partially or wholly removed from the solution by crystallization. The solution is purified by treatment with hydrogen sulphide or an acid soluble sulphide, capable of generating hydrogen sulphide in solution, and is then filtered or otherwise treated to separate the solution from solids or colloidal materials contained therein.

Water is then evaporated from the purified and clarified solution until there is a titanium content concentration of from substantially 150 to substantially 250 grams per litre, calculated as titanium dioxide. I have found that improved results are obtained by conducting hydrolytic precipitation in a solution having the titanium dioxide content range referred to above and a basicity of between substantially 5% and 50%, and preferably between substantially 20% and 45%.

I have discovered that in addition to the titanium dioxide content and basicity control, improved results are derived if, prior to or during the hydrolytic reaction, small amounts of an "initiator" or acid-binding substances, for example, ammonia, or the oxides, hydroxides, or carbonates of zinc, magnesium, or the alkali metals are added.

It should be understood that the purpose of adding the acid-binding substances is not to eliminate residual acid, for the acid content of the solution, prior to this step, contains less acid than is necessary for the formation of normal salts.

I explain the action of the acid binders to be that of initiating the hydrolytic decomposition, because the "basic" titanium solutions, being in a metastable or transition state, their addition breaks down the condition of metastability by causing a sudden local decrease in acidity when they are brought in contact with the solution.

Moreover, sintering agents, for example, sulphates, chlorides, silicates, borates, or boric acid, may be added to the precipitate prior to calcination. The sintering agents lower the oil-absorption and give a more dense product, respectively lower the calcination temperature and support the agglomeration of the particles. The quantity of sintering agents may be about 0.1–1%, but in some cases more.

It is found that pigments prepared by the method herein disclosed are smooth and soft in texture, are in a state of extremely fine subdivision, have high tinting strength, covering power and brilliancy, and are of a clear, white color. Moreover, such pigments are practically neutral and free from soluble salts and other impurities and have excellent grinding and mixing properties.

These improved properties, are largely influenced by the permitted basicity range of the titanium salt solution in which hydrolytic precipitation takes place, as well as by the presence of a small quantity of acid binding substance in the solution which affect the properties of the calcined product advantageously.

The physical properties of the pigments produced are of marked degree and characterize the pigment as a novel product. While it is difficult to define the pigment as being characterized by any particular one or more of these, I attribute such properties of the pigment to the novel process by which the pigment is made.

The improved process may with advantage be employed for the production of composite titanium pigments containing any desired proportion of titanium dioxide, the carrier material, for example one or more extenders, being according to known practice, suspended in the solution during the hydrolysis step, so that the titanium compounds are precipitated thereon. The composite precipitate obtained in this way is treated in similar manner as above described with reference to a plain titanium dioxide precipitate.

The foregoing detailed description has been given for clearness of understanding and no undue limitation should be deducted therefrom, but the appended claims should be construed as broadly as permissible in view of the prior art.

I claim:

1. The process which comprises decomposing a titaniferous mineral with a total quantity of acid, equivalent to the bases in the raw mineral other than titanium for the formation of normal salts of these bases, and in addition to this amount, a further quantity of acid substantially 5% to 50% less than the equivalent of the titanium content of the raw material for the formation of tetravalent titanium salts, varying the titanium dioxide content to obtain from 150 to 250 grams per litre, subjecting the solution to hydrolysis, in the presence of an agent suitable for forming non-hydrolyzed sulphates with the titanium sulphates present, the quantity of said agent employed being small and such as not materially to change the acidity of the solution, washing the resultant precipitate and calcining the same.

2. A process for the manufacture of titanium compounds, comprising subjecting a titanium sulphate solution, containing substantially 5% to 50% less sulphuric acid than required to form normal tetravalent sulphate with the titanium present when normal salts of other bases present have been formed, to hydrolytic decomposition in the presence of an agent suitable for forming non-hydrolyzed sulphates with the titanium sulphates present, the quantity of said agent employed being small and such as not materially to change the acidity of the solution.

3. A process for the manufacture of titanium compounds, comprising subjecting a titanium sulphate solution containing substantially 5% to 50% less sulphuric acid than required to form normal tetravalent sulphate with the titanium present when normal salts of other bases present have been formed, to hydrolytic decomposition in the presence of a neutralizing alkali compound, the quantity of said alkali compound being small and not substantially in excess of that required to break down the metastability of the solution.

4. A process for the manufacture of titanium compounds, comprising subjecting a titanium sulphate solution containing substantially 5% to 50% less sulphuric acid than required to form normal tetravalent sulphate with the titanium present when normal salts of other bases present have been formed, to hydrolytic decomposition in the presence of sodium carbonate, the quantity of said sodium carbonate employed being small and not substantially in excess of that required to break down the metastability of the solution.

5. A process for the manufacture of titanium compounds, comprising subjecting a titanium sulphate solution containing substantially 150 to 250 grams titanium dioxide per liter and containing substantially 5% to 50% less sulphuric acid than required to form normal sulphate with the titanium present when normal salts of other bases present have been formed, to hydrolytic decomposition in the presence of an agent suitable for forming non-hydrolyzed sulphates with the titanium sulphates present, the quantity of said agent employed being small and such as not materially to change the acidity of the solution.

6. A process for the manufacture of titanium compounds, comprising subjecting a titanium sulphate solution containing substantially 150 to 250 grams titanium dioxide per liter and containing substantially 5% to 50% less sulphuric acid than required to form normal sulphate with the titanium present when normal salts of other bases present have been formed, to hydrolytic decomposition in the presence of a neutralizing alkali compound, the quantity of said alkali compound employed being small and not substantially in excess of that required to break down the metastability of the solution.

7. A process for the manufacture of titanium pigments, comprising subjecting a titanium sulphate solution containing substantially 5% to 50% less sulphuric acid than required to form the normal titanium sulphate with the titanium present when normal salts of other bases have been formed, to hydrolytic decomposition in the presence of an agent suitable for forming non-hydrolyzed sulphates with the titanium sulphates present, the quantity of said agent employed being small and such as not materially to change the acidity of the solution, removing the precipitate, washing, drying and calcining it.

8. A process for the manufacture of titanium pigments, comprising subjecting a titanium sulphate solution containing substantially 5% to 50% less sulphuric acid than required to form normal titanium sulphate with the titanium present when normal salts of other bases present have been formed, to hydrolytic decomposition in the presence of an agent suitable for forming non-hydrolyzed sulphates with the titanium sulphates present, the quantity of said agent employed being small and such as not materially to change the acidity of the solution, removing and washing the precipitate, adding a phosphate, drying and calcining it.

9. A process for the manufacture of composite titanium pigments, comprising subjecting a titanium sulphate solution containing substantially 5% to 50% less sulphuric acid than required to form normal titanium sulphate with the titanium present, when normal salts of other bases present have been formed, to hydrolytic decomposition in the presence of an agent suitable for forming non-hydrolyzed sulphates with the titanium sulphates present, the quantity of said agent employed being small and such as not materially to change the acidity of the solution, and in the presence of an extender, removing the composite precipitate, washing, drying and calcining it.

10. A process for the manufacture of titanium compounds, comprising subjecting a titanium sulphate solution containing substantially 5% to 50% less sulphuric acid than required to form normal tetravalent sulphate with the titanium present, when normal salts of other bases present have been formed, to hydrolytic decompositon under a pressure greater than that of the atmosphere in the presence of an agent suitable for forming non-hydrolyzed sulphates with the titanium sulphates present, the quantity of said agent employed being small and such as not materially to change the acidity of the solution.

11. A process for the manufacture of titanium compounds, comprising subjecting a titanium sulphate solution, containing substantially 5% to 50% less sulphuric acid than required to form normal tetravalent sulphate with the titanium present when normal salts of other bases present have been formed, to hydrolytic decomposition in the presence of an agent suitable for forming soluble non-hydrolyzed sulphates with the titanium sulphates present, the quantity of said agent employed being small and such as not materially to change the acidity of the solution.

12. A process for the manufacture of titanium compounds, comprising subjecting a titanium sulphate solution containing substantially 150 to 250 grams titanium dioxide per liter and containing substantially 5% to 50% less sulphuric acid than required to form normal sulphate with the titanium present when normal salts of other bases have been formed, to hydrolytic decomposition in the presence of an agent suitable for forming soluble non-hydrolyzed sulphates with the titanium sulphates present, the quantity of said agent employed being small and such as not materially to change the acidity of the solution.

13. A process for the manufacture of titanium compounds, comprising subjecting a titanium sulphate solution containing substantially 150 to 250 grams titanium dioxide per liter and containing substantially 5% to 50% less sulphuric acid than required to form normal tetravalent sulphate with the titanium present, when normal sulphates of other bases present have been formed, to hydrolytic decomposition in the presence of a small amount of ammonia substantially not in excess of that required to break down the metastability of said solution.

14. A process for the manufacture of titanium compounds, comprising subjecting a titanium sulphate solution containing substantially 150 to 250 grams titanium dioxide per liter and containing substantially 5% to 50% less sulphuric acid than required to form normal tetravalent sulphate with the titanium present, when normal sulphates of other bases present have been formed, to hydrolytic decomposition in the presence of an alkaline reacting compound of zinc containing combined oxygen, suitable for forming soluble non-hydrolyzed sulphates with the titanium sulphate present in said solution, the amount of the said compound of zinc employed being small and not substantially in excess of that required to break down the metastability of said solution.

15. A process for the manufacture of titanium compounds, comprising subjecting a titanium sulphate solution containing substantially 150 to 250 grams titanium dioxide per liter and containing substantially 5% to 50% less sulphuric acid than required to form normal tetravalent sulphate with the titanium present, when normal sulphates of other bases present have been formed, to hydrolytic decomposition in the presence of one of the agents, an oxide of magnesium, a hydroxide of magnesium, a carbonate of magnesium, an oxide of one of the alkali metals, a hydroxide of one of the alkali metals, a carbonate of one of the alkali metals, suitable for forming soluble non-hydrolyzed sulphates with the titanium sulphate present in said solution, the amount of said agent employed being small and not substantially in excess of that required to break down the metastability of said solution.

16. A process for the manufacture of titanium compounds, comprising subjecting a titanium sulphate solution containing substantially 150 to 250 grams titanium dioxide per liter and containing substantially 20% to 45% less sulphuric acid than required to form tetravalent sulphate with the titanium present when normal salts of other bases present have been formed, to hydrolytic decomposition in the presence of an agent suitable for forming non-hydrolyzed sulphates with the titanium sulphates present, the quantity of said agent being small and such as not materially to change the acidity of the solution.

17. A process for the manufacture of titanium compounds, comprising subjecting a titanium sulphate solution containing substantially 150 to 250 grams titanium dioxide per liter and containing substantially 20% to 45% less sulphuric acid than required to form normal tetravalent sulphate with the titanium present when normal salts of other bases present have been formed, to hydrolytic decomposition in the presence of an agent suitable for forming soluble non-hydrolyzed sulphates with the titanium sulphates present, the quantity of said agent employed being small and such as not materially to change the acidity of the solution.

ANDREAS JOHAN RAVNESTAD.